3,090,797
Patented May 21, 1963

3,090,797
CIS, CIS BUTADIENYL METAL HALIDES
Harold H. Freedman, Brookline, Mass., assignor to The Dow Chemical Company, Midland, Mich., a corporation of Delaware
No Drawing. Filed Nov. 28, 1960, Ser. No. 71,899
10 Claims. (Cl. 260—429)

This invention relates to the preparation of a new kind of organo metallic compound having a conjugated unsaturated bond system in the molecule and further characterized by the presence of a plurality of halogen atoms in the molecule.

For a variety of purposes organo metallic compounds of unusual structures are useful. For example, when it is desired to introduce metal or halogen, or a combination of both, into a vapor phase reaction mixture for the catalytic effect which is obtained from free radicals, the organo metallic compounds are found to be most useful. More specifically, where such an organo metallic compound includes unsaturated bonds, or conjugated unsaturated bonds, it is useful in polymerization reactions.

It is, accordingly, a fundamental object of the invention to provide a sequence of organo metallic compounds characterized by their being based on a conjugated double bond system wherein the molecule also carries halogen atoms.

It is another object of the invention to provide a method for the preparation of organo metallic compounds having a conjugated double bond system, wherein the method of preparation is characterized by formation of these compounds from certain starting metal-ole compounds.

Other objects and advantages of the invention will in part be obvious and in part appear hereinafter.

The invention, accordingly, is concerned with a family of metallo organic compounds based on a cis-cis butadiene nucleus and to the method of preparation of compounds having formulas corresponding to the following generalized representation:

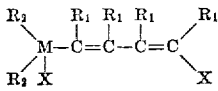

In the preparation of compounds corresponding to this representation I take advantage of the fact that certain cyclic metal-ole compounds when halogenated will cleave the ring at the carbon metal bond as illustrated in the following equation:

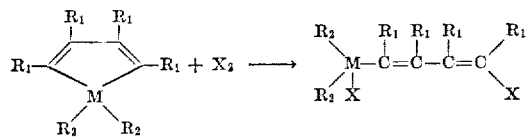

with the result that the halogen is added to the molecule at the point of the cleavage, thereby producing a cis-cis butadiene compound having a metal-halogen moiety at one end of the molecule, with halogen moiety at the other end of the same molecule.

The method of preparation involves dissolving the starting metal-ole compound in an appropriate solvent, maintaining the temperature of the solution close to ambient temperature and carefully regulating the addition, and rate of addition of the halogen to induce the ring cleavage and formation of the butadiene compound.

The general representation for compounds corresponding to this invention may be drawn as follows:

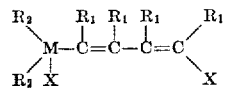

and in this representation the several $R_1$ groups may be phenyl, alkyl or hydrogen, depending upon the nature of the starting material and the $R_2$ groups may be alkyl or phenyl, i.e., methyl, ethyl or other relatively low molecular weight alkyl groups; X may be chloro, bromo, iodo, and M may be tin, lead or germanium.

Typical compounds which can be made in accordance with this process are the following:

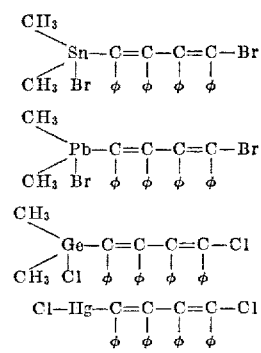

It is to be understood that where the starting metals are in their bivalent form the alkyl groups, aryl groups, etc., will only be present in sufficient number to furnish the required number of said substituents in the molecule.

It may be seen from the structure of this molecule that with decomposition in a medium, cleavage of the metal-carbon bond of the halo-metal-butadiene compound will occur leaving the halo-butadiene free radical and the alkyl-metal free radical in the system in a very active state. It is for this reason that this kind of metal-carbon bond is highly desirable and useful in chemical synthesis.

In further generalization of the representation the several substituents identified as $R_1$ and $R_2$ in the molecule may be any alkyl or aryl groups as well as any of the usual common functional groups encountered in organic chemistry such as halogen, hydroxyl, cyano, ether, ester and acid groups, provided the presence of these substituents in the molecule does not materially alter the basic properties of the metal-carbon bond and does not sterically interfere with the reaction. As starting metals for the metal-ole compound, tin, lead, germanium and mercury are to be preferred.

In the preparation it is most desirable that a solution of the metal-ole compound serve as the reaction medium and that the halogen be introduced into that solution with care so that the introduction of an excess beyond a 1:1 molar ratio is avoided. The temperature at which the reaction is carried out is not critical but it is fundamentally preferable to maintain the temperature at approximately ambient levels. A temperature range from $-50°$ to about $100°$ C. is acceptable. Since the reaction is substantially instantaneous time is not a factor. Since it is a liquid phase reaction, pressure is a secondary consideration only. In other words, for conducting the reaction most conveniently, a liquid phase at approximately ambient temperature is preferred, the essential variable to be controlled being the rate of introduction and the amount of halogen used, this being kept at a level such that a 1:1 molar ratio is not exceeded.

When the reaction is conducted in this fashion it will be found that the yield is quantitative.

For a better and more detailed understanding of the nature of the invention and the technique of preparation

3 of the compounds, reference may be had to the following illustrative examples:

EXAMPLE I

*Preparation of (4-Bromo-1,3 Cis-Cis Butadienyl)- Dimethyl Tin Bromide*

Five and a half grams (0.01 mol) of 1,1-dimethyl-2,3,4,5-tetraphenylstannole is dissolved in 50 milliliters of chloroform, and to this solution at room temperature, with stirring, is added dropwise 10 milliliters of a one normal solution of bromine in chloroform or carbon tetrachloride. The yellow color of the stannole fades toward the end of the addition, but otherwise no change is observed. The solvent is evaporated to yield a yellow oil which crystallizes on the addition of alcohol. Crystallization of the yellow solid from alcohol with the help of methylene chloride (charcoal) affords pale yellow prisms of the desired compound, melting point 142–3° C. The yield is 6.5 grams or approximately 98%. The compound analyzes correctly for $C_{30}H_{26}Br_2Sn$ (found: C, 54.3; H, 3.9). This corresponds to the formula:

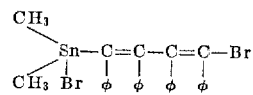

EXAMPLE II

Following the procedure given in Example I, the corresponding lead compound will yield the following:

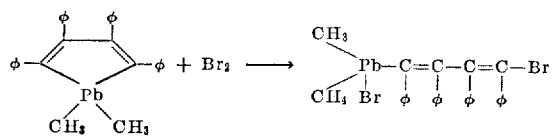

The lead compound as thus prepared is a good antiknock agent for use in the formulation of fuels for internal combustion engines.

EXAMPLE III

Starting with the germanium compound corresponding to the tin compound shown in Example 1 and reacting the said compound in solution with chlorine as described, the following germanium compound is prepared:

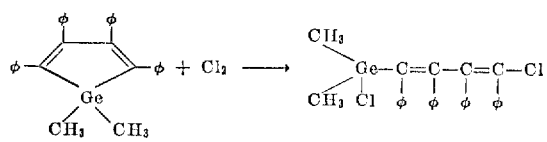

In my copending application, Serial No. 71,898, filed of even date herewith, which may be considered fully incorporated herein, I describe the formation of cyclic butadiene complexes.

What is claimed is:

1. (4-halo-1,3 butadienyl)-organo metal halide compounds corresponding to the following representation:

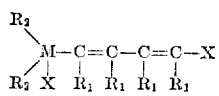

wherein $R_1$ and $R_2$ represent moieties selected from the group consisting of hydrogen, alkyl, aryl and halogen, hydroxyl and cyano substituted alkyl and aryl moieties; X represents a halogen selected from the group consisting of chlorine, bromine and iodine; and M is a metal selected from the group consisting of tin, lead, and germanium, and mercury in at least its bivalent form.

2. A compound corresponding to the following:

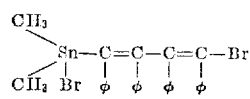

3. A compound corresponding to the following:

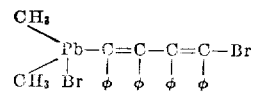

4. A compound corresponding to the following:

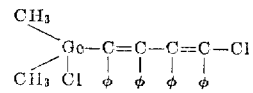

5. A compound corresponding to the following:

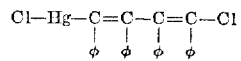

6. The method of preparing a (4-halo-1,3, butadienyl)-organo metal halide, which comprises dissolving in an inert organic solvent a metal-ole compound corresponding to the following generalized representation:

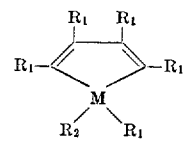

wherein $R_1$ and $R_2$ represent moieties selected from the group consisting of hydrogen, alkyl, aryl and halogen, hydroxyl and cyano substituted alkyl and aryl moieties; and M is a metal selected from groups consisting of tin, lead, and germanium, and mercury in at least its bivalent form maintaining said solution at approximately ambient temperature while adding a halogen, keeping the amount of halogen thus added to a level not more than a 1:1 molar ratio with the starting metal-ole compound and, thereafter, recovering the butadienyl dimethyl metal halide from the reactant material.

7. The method in accordance with claim 6 in which the solvent for the reactants is a volatile one boiling at a temperature below about 100° C., and the reaction product is recovered by evaporating the solvent therefrom.

8. The method of preparing (4-bromo-1,3 butadienyl)-dimethyl tin bromide which comprises dissolving 1,1-dimethyl 2,3,4,5-tetra-phenyl stannole in an inert organic solvent, maintaining said solution at approximately ambient temperature, adding thereto a solution of bromine in an inert organic solvent, keeping the amount of bromine added to a level not to exceed a 1:1 molar ratio with the starting 1,1-dimethyl 2,3,4,5-tetraphenylstannole and, thereafter, recovering (4-bromo-1,3 butadienyl)-dimethyl tin bromide.

9. The method of preparing (4-bromo-1,3 butadienyl)-dimethyl lead bromide which comprises dissolving 1,1-dimethyl 2,3,4,5-tetra-phenyl plumbole in an inert organic solvent, maintaining said solution at approximately ambient temperature, adding thereto a solution of bromine in an inert organic solvent, keeping the amount of bromine added to a level not to exceed a 1:1 molar ratio with the starting 1,1-dimethyl 2,3,4,5-tetra-phenyl plumbole and, thereafter, recovering (4-bromo-1,3 butadienyl)-dimethyl lead bromide.

10. The method of preparing a (4-halo-1,3 butadienyl)-dialkyl metal halide, which comprises dissolving in an inert organic solvent a metal-ole compound corresponding to the following generalized representation:

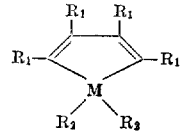

wherein $R_1$ and $R_2$ represent moieties selected from the group consisting of hydrogen, alkyl, aryl and halogen, hydroxyl and cyano substituted alkyl and aryl moieties; and M is a metal selected from group consisting of tin, lead, germanium and mercury in at least its bivalent form, with the solution being in a temperature range from about −50° C. to about 100° C. while adding a halogen, keeping the amount of halogen thus added to a level not more than a 1:1 molar ratio with the starting metal-ole compound and, thereafter, recovering the butadienyl dimethyl metal halide from the reactant material.

References Cited in the file of this patent

UNITED STATES PATENTS

| | | |
|---|---|---|
| 2,873,287 | Ramsden | Feb. 10, 1959 |
| 2,873,288 | Rosenberg et al. | Feb. 10, 1959 |
| 2,921,954 | Ramsden | Jan. 19, 1960 |
| 2,962,522 | Gibbons et al. | Nov. 29, 1960 |
| 2,965,661 | Ramsden | Dec. 20, 1960 |

UNITED STATES PATENT OFFICE
CERTIFICATE OF CORRECTION

Patent No. 3,090,797                                May 21, 1963

Harold H. Freedman

It is hereby certified that error appears in the above numbered patent requiring correction and that the said Letters Patent should read as corrected below.

Column 3, lines 30 to 35, the formula should appear as shown below instead of as in the patent:

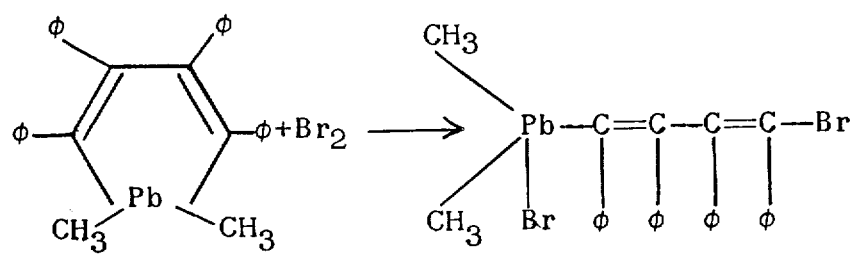

column 4, lines 20 to 25, the formula should appear as shown below instead of as in the patent:

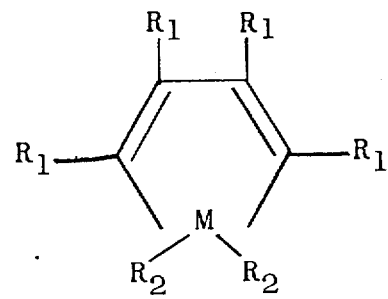

Signed and sealed this 12th day of May 1964.

(SEAL)
Attest:

ERNEST W. SWIDER                            EDWARD J. BRENNER

Attesting Officer                          Commissioner of Patents